(12) United States Patent
Qian et al.

(10) Patent No.: US 8,984,483 B2
(45) Date of Patent: Mar. 17, 2015

(54) CONTROL METHOD AND SYSTEM FOR REMOTE CONFIGURATION

(75) Inventors: Yan Qian, Shenzhen (CN); Hongcheng Luo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 280 days.

(21) Appl. No.: 13/505,040

(22) PCT Filed: Apr. 13, 2010

(86) PCT No.: PCT/CN2010/071722
§ 371 (c)(1),
(2), (4) Date: Apr. 30, 2012

(87) PCT Pub. No.: WO2010/148714
PCT Pub. Date: Dec. 29, 2010

(65) Prior Publication Data
US 2012/0221689 A1      Aug. 30, 2012

(30) Foreign Application Priority Data
Nov. 10, 2009   (CN) .......................... 2009 1 0110070

(51) Int. Cl.
*G06F 9/44*     (2006.01)
*G06F 7/00*     (2006.01)
(Continued)

(52) U.S. Cl.
CPC ............ *H04L 41/0843* (2013.01); *H04L 67/34* (2013.01)
USPC ........... 717/121; 717/104; 717/120; 717/126; 707/634

(58) Field of Classification Search
CPC ...................................................... G06F 8/71
See application file for complete search history.

(56) References Cited

U.S. PATENT DOCUMENTS

| 6,094,679 A | 7/2000 | Teng et al. |
| 7,756,828 B2 * | 7/2010 | Baron et al. .................. 707/634 |

(Continued)

FOREIGN PATENT DOCUMENTS

| CN | 1691556 A | 11/2005 |
| CN | 101502079 A | 8/2009 |

OTHER PUBLICATIONS

Ulf Asklund et al. "A Study of Configuration Management in Open Source Software Projects", [Online] , IEEE 2002, pp. 1-10, [Retrieved from Internet on Dec. 5, 2014],<http://fileadmin.cs.lth.se/cs/personal/lars_bendix/publications/ab02/cm4oss.pdf>.*

(Continued)

*Primary Examiner* — Thuy Dao
*Assistant Examiner* — Ziaul A Chowdhury
(74) *Attorney, Agent, or Firm* — Banner & Witcoff, Ltd.

(57) ABSTRACT

A method for controlling remote configuration includes: a configuration management terminal requesting a configuration file to be remotely configured and managed from a configuration management server; the configuration management server returning a configuration item of the configuration file to the configuration management terminal according to a configuration definition corresponding to the configuration file, with the configuration definition including the attributes of the configuration item in the corresponding configuration file; and the configuration management terminal modifying the configuration item and then submitting the modified configuration item to the configuration management server, and the configuration management terminal modifying the configuration file after modifying and verifying the submitted configuration item according to the attributes of the configuration item. A system for controlling remote configuration maintains and manages the configuration items of various configuration files according to the configuration definitions corresponding to the configuration files, so as to achieve universal management of configuration files.

18 Claims, 5 Drawing Sheets

(51) Int. Cl.
*H04L 12/24* (2006.01)
*H04L 29/08* (2006.01)

(56) References Cited

U.S. PATENT DOCUMENTS

| | | | | |
|---|---|---|---|---|
| 7,913,227 | B2* | 3/2011 | Aikens et al. | 717/120 |
| 7,926,031 | B2* | 4/2011 | Faihe et al. | 717/121 |
| 7,971,231 | B2* | 6/2011 | Gupta et al. | 726/1 |
| 8,060,592 | B1* | 11/2011 | Watsen et al. | 709/223 |
| 8,140,475 | B1* | 3/2012 | Sparks | 707/634 |
| 8,549,484 | B2* | 10/2013 | Wada et al. | 717/126 |
| 2003/0200286 | A1* | 10/2003 | Barfurth et al. | 709/220 |
| 2004/0032625 | A1* | 2/2004 | Yamano | 358/405 |
| 2004/0034853 | A1 | 2/2004 | Gibbons et al. | |
| 2005/0114479 | A1* | 5/2005 | Watson-Luke | 709/220 |
| 2005/0114851 | A1* | 5/2005 | Watson-Luke et al. | 717/168 |
| 2005/0245249 | A1 | 11/2005 | Wierman et al. | |
| 2006/0161895 | A1* | 7/2006 | Speeter et al. | 717/121 |
| 2006/0248123 | A1* | 11/2006 | Butash et al. | 707/201 |
| 2006/0265386 | A1* | 11/2006 | Richter | 707/10 |
| 2007/0256050 | A1* | 11/2007 | Behnia et al. | 717/104 |
| 2008/0059943 | A1* | 3/2008 | Krevs et al. | 717/103 |
| 2008/0209398 | A1* | 8/2008 | Aikens et al. | 717/121 |
| 2008/0235357 | A1* | 9/2008 | Gustafsson | 709/220 |
| 2010/0121987 | A1* | 5/2010 | Yun | 710/8 |
| 2011/0055165 | A1* | 3/2011 | McKay | 707/682 |
| 2011/0055636 | A1* | 3/2011 | DeHaan et al. | 714/37 |

OTHER PUBLICATIONS

Jacky Estublier et al. "Impact of Software Engineering Research on the Practice of Software Configuration Management", [Online], ACM 2005, pp. 1-48, [Retrived from Internet on Dec. 5, 2014], <http://www-adele.imag.fr/Les.Publications/journals/ImpactSCM-Final-Tosem.pdf>.*

H. Madduri et al., "A configuration management database architecture in support of IBM Service Management" [Online], IEEE 2007, pp. 411-457, [Retrieved from Internet on Dec. 5, 2014], <http://ieeexplore.ieee.org/stamp/stamp.jsp?tp=&arnumber=5386571>.*

Rodrigo P. Pantoni et al., "Configuration Management for Fieldbus Automation Systems", [Online], IEEE 2007, pp. 1844-1848, [Retrieved from Internet on Dec. 5, 2014], <http://ieeexplore.ieee.org/stamp/stamp.jsp?tp=&arnumber=4374886>.*

International Search Report dated Aug. 19, 2010 for PCT/CN2010/071722.

* cited by examiner

CONTROL METHOD AND SYSTEM FOR REMOTE CONFIGURATION

TECHNICAL FIELD

The present invention relates to the configuration file management technology in the technical field of telecommunication, and particularly, to a method and system for controlling remote configuration.

BACKGROUND OF THE RELATED ART

The modification and view of the configuration files are necessary for installation, upgrade and daily maintenance, however, with the enlargement of the application systems, there are more and more configuration files and configuration items, the management method of manually operating the configuration files has to switch among different hosts and repeatedly perform operations such as opening file, modifying file, saving file, etc., and when there are lots of file contents, the modification location cannot be positioned rapidly. The requirements on the operation and maintenance personnel are high, and they are required to be able to skillfully operate the edit tools of the operating systems. When directly modifying the files, there is no restriction on the input contents, which tends to result in modification errors and operation failure of the system. For example, characters are inputted where numbers should be inputted, and the input values where an IP address should be inputted fail to comply with the specification of the IP address. It is also difficult to manage the right of the configuration files and configuration items, i.e. different configuration files and configuration items are exhibited to different users. For example, the configuration files and configuration items which different types of users concern may be different; those files which need to be modified during installation may not be necessary during daily maintenance; and those configuration items which the short message service is interested in need not to be modified for the multimedia message service. The modification history cannot be recorded, and the modification history cannot be compared, which will bring certain risk to the maintenance work.

In the related art, although the interface configuration method for managing the configuration file partially solves the above problems, i.e. the user needs not to directly operate the files, instead, the modification of the file is achieved by a program, such method still has the following defects:

1. the program is dedicatedly written for a certain or some configuration files and not suitable for other configuration files, i.e. it has not universality; and 2. if there is a new configuration file, then a configuration page needs to be developed, which requires redeveloping a new program and has to go through steps such as test, issue, upgrade, etc., the period is rather long.

CONTENT OF THE INVENTION

In view of this, the main technical problem to be solved in the present invention is to provide a universal method for controlling remote configuration and a system based on this method.

In order to solve the above technical problem, the present invention provides a method for controlling remote configuration, comprising: a configuration management terminal requesting a configuration file to be remotely configured and managed from a configuration management server; the configuration management server returning a configuration item of the configuration file to the configuration management terminal according to a configuration definition corresponding to the configuration file, with the configuration definition comprising attributes of the configuration item in the corresponding configuration file; and the configuration management terminal modifying the configuration item and then submitting the modified configuration item to the configuration management server, and the configuration management terminal modifying the configuration file after modifying and verifying the submitted configuration item according to the attributes of the configuration item.

The attributes of the configuration item comprises value type, maximum, minimum and user right.

The configuration definition is a file in a format of extensible markup language (XML).

The configuration management server returning a configuration item of the configuration file to the configuration management terminal according to a configuration definition corresponding to the configuration file in particular comprises: the configuration management server sending a request for the configuration file and the configuration definition to a server where the configuration file is located according to the configuration file; the server where the configuration file is located returning the configuration file and configuration definition; and the configuration management server returning the configuration item of the configuration file to the configuration management terminal according to the configuration definition in combination with the user right of the configuration management terminal.

The server where the configuration file is located returning the configuration file and configuration definition is performed according to the following operations particularly: the server where the configuration file is located uploading the configuration file and configuration definition to an FTP server; the server where the configuration file is located notifying the configuration management server that the upload is completed; and the configuration management server downloading the configuration file and configuration definition from the FTP server.

The method further comprises: the server where the configuration file is located receiving the request for the configuration file and configuration definition sent from the configuration management server particularly via a first residing module, and uploading the configuration file and configuration definition to the FTP server to notify the configuration management server that the upload is completed.

The configuration management terminal modifying the configuration item and submitting the modified configuration item to the configuration management server, and the configuration management terminal modifying the configuration file after modifying and verifying the submitted configuration item according to the attributes of the configuration item in particular comprises: the configuration management terminal modifying the configuration item; the configuration management server verifying the modified configuration item and modifying the configuration file according to the configuration definition; the configuration management server uploading the modified configuration file to the FTP server; the configuration management server notifying the first residing module to download the modified configuration file; and the first residing module downloading the modified configuration file from the FTP server.

The method further comprises a process of maintaining the configuration definition, with the maintenance comprising generation and modification.

The configuration management terminal requesting a configuration file to be remotely configured and managed from a configuration management server and the configuration management server returning a configuration item of the configuration file to the configuration management terminal according to a configuration definition corresponding to the configuration file in particular comprises: the configuration management terminal requesting a configuration file of a node to be remotely configured and managed from the configuration management server; the configuration management server obtaining a configuration file list according to the configuration file; the configuration management server returning the configuration file list to the configuration management terminal; the configuration management terminal selecting a configuration file to be modified from the configuration file list; and the configuration management server returning a configuration item to a user according to the configuration definition of the selected configuration file.

The configuration management server returning the configuration file list to the configuration management terminal in particular comprises: the configuration management server requesting the configuration file list from a server which has the configuration file list according to the configuration file by way of configuration file list definition; and the server which has the configuration file list returning the configuration file list.

The configuration file list definition is a file in a format of XML.

The configuration file list definition comprises file name, file path and user right.

The configuration management server requesting the configuration file list from a server which has the configuration file list according to the configuration file by way of the configuration file list definition in particular comprises: the configuration management server requesting the configuration file list definition from a server which includes the configuration file list definition of the configuration file according to the configuration file; the server which includes the configuration file list definition of the configuration file uploading the configuration file list definition to the FTP server via a second residing module; the configuration management server downloading the configuration file list definition from the FTP server; the configuration management server querying the configuration file list according to the file name and path in the configuration file list definition; and the configuration management server returning the configuration file list to the configuration management terminal.

The method further comprises a process of maintaining the configuration file list definition, with the maintenance comprising generation and modification.

The method further comprising: the configuration management server recording the configuration file before being modified and the modified configuration file together with information about the configuration management terminal into a database.

Wherein the configuration management terminal is a WEB browser terminal, and the configuration management server is a WEB server.

The present invention also provides a system for controlling remote configuration, comprising a configuration management terminal and a configuration management server, wherein, the configuration management terminal is used for requesting a configuration file to be remotely configured and managed from the configuration management server and further used for modifying a configuration item and submitting the modified configuration item to the configuration management server; and the configuration management server is used for returning the configuration item of the configuration file to the configuration management terminal according to configuration definition corresponding to the configuration file, with the configuration definition comprising attributes of the configuration item corresponding to the configuration file; and further used for modifying the configuration file after modifying and verifying the submitted configuration item according to the attributes of the configuration item.

The configuration management server is further used for receiving the configuration file and configuration definition returned by a server where the configuration file is located according to a request for the configuration file and configuration definition sent by the server where the configuration file is located, and returning the configuration item of the configuration file to the configuration management terminal according to the configuration definition in combination with the user right of the configuration management terminal; and the system further comprises a first residing module and an FTP server, wherein the first residing module is configured in a server of a node to be configured and managed, and used for receiving the request for the configuration file and configuration definition sent by the configuration management server and uploading the configuration file and configuration definition to the FTP server to notify the configuration management server that the upload is completed; the configuration management server is further used for downloading the configuration file and configuration definition from the FTP server; and the FTP server is used for receiving the configuration file and configuration definition uploaded by the first residing module and sending the configuration file and configuration definition to the configuration management server which requests for the downloading.

The configuration management server is further used for requesting a configuration file list definition from a server which has the configuration file list definition of the configuration file according to the configuration file; the system further comprises a second residing module, configured in the server of the node to be configured and managed and is used for receiving a request for the configuration file list definition sent by the configuration management server and uploading the configuration file list definition to the FTP server; and the configuration management server is further used for downloading the configuration file list definition from the FTP server, querying the configuration file list according to the file name and path in the configuration file list definition, and returning the configuration file list to the configuration management terminal.

The beneficial effects of the present invention are as follows:

(1) the present invention maintains and manages the configuration items of various configuration files according to the configuration definitions corresponding to the configuration files, so as to achieve universal management of configuration files, and when a new configuration file occurs, it can be extended by way of the configuration definition;

(2) the configuration item attribute definition in the configuration definition can conveniently manage and monitor the configuration item, enabling that the modification thereto can be verified, and the user rights setting can control which users to modify which configuration items in different scenarios.

PREFERRED EMBODIMENTS OF THE PRESENT INVENTION

Hereinafter, the present invention will be further described in detail by way of particular embodiments in conjunction with the accompanying drawings.

Figure 1:
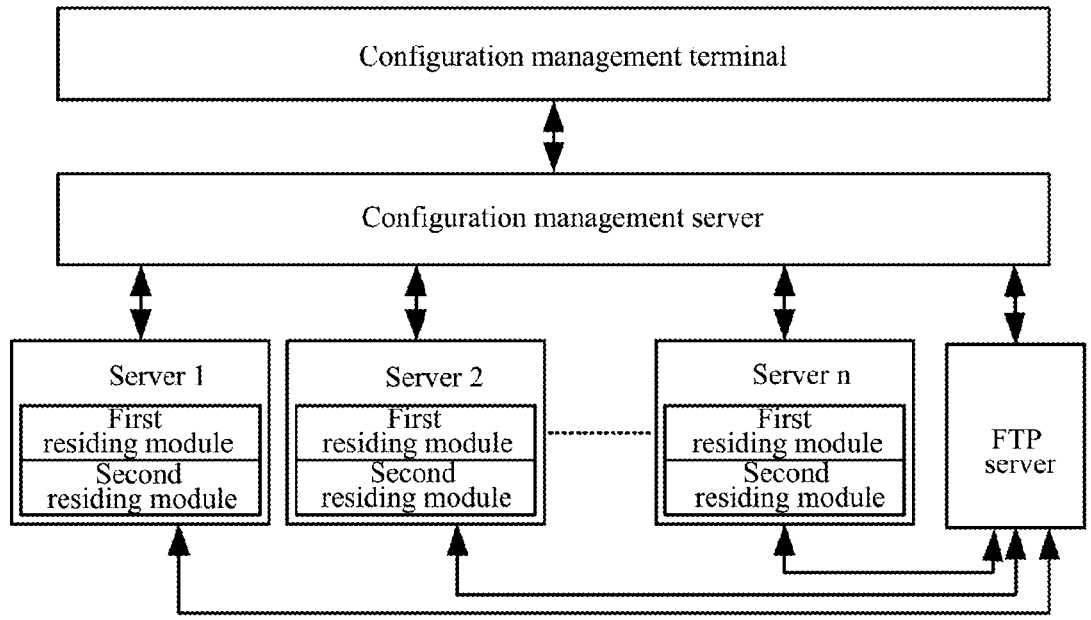
FIG. 1 is a structural schematic diagram of an embodiment of a system according to the present invention.

As shown in FIG. 1, an embodiment of a system for controlling remote configuration according to the present invention comprises a configuration management terminal and a configuration management server, wherein the configuration management terminal is used for requesting a configuration file to be remotely configured and managed from the configuration management server; the configuration management server is used for returning the configuration item of the configuration file to the configuration management terminal according to a configuration definition corresponding to the configuration file, with the configuration definition comprising attributes of the configuration item corresponding to the configuration file; the configuration management terminal is further for modifying a configuration item and submitting the same to the configuration management server; the configuration management server is further used for modifying the configuration file after modifying and verifying the submitted configuration item according to the attributes of the configuration item.

The configuration management server is further used for sending, according to the configuration file, a request for the configuration file and configuration definition to a server where the configuration file is located, receiving the configuration file and configuration definition returned by the server where the configuration file is located, and returning the configuration item of the configuration file to the configuration management terminal according to the configuration definition in combination with the user rights of the configuration management terminal.

According to an embodiment of the system of the present invention, a first residing module and a file transfer protocol (FTP) server are comprised, wherein the first residing module is provided in a server of the node to be configured and managed, for receiving the request for the configuration file and configuration definition sent by the configuration management server and uploading the configuration file and configuration definition to the FTP server to notify the configuration management server that the upload is completed; the configuration management server is further used for downloading the configuration file and configuration definition from the FTP server; and the FTP server is used for receiving the configuration file and configuration definition uploaded by the first residing module and sending the configuration file and configuration definition to the configuration management server which requests the download.

According to the embodiments of the present invention, the configuration management server is further used for requesting a configuration file list definition from a server which has the configuration file list definition of the configuration file according to the configuration file; the system further comprises a second residing module, which is provided in the server of the node to be configured and managed and is used for receiving a request for the configuration file list definition sent by the configuration management server and uploading the configuration file list definition to the FTP server; and the configuration management server is further used for downloading the configuration file list definition from the FTP server, querying the configuration file list according to the file name and path in the configuration file list definition, and returning the configuration file list to the configuration management terminal.

Figure 2:
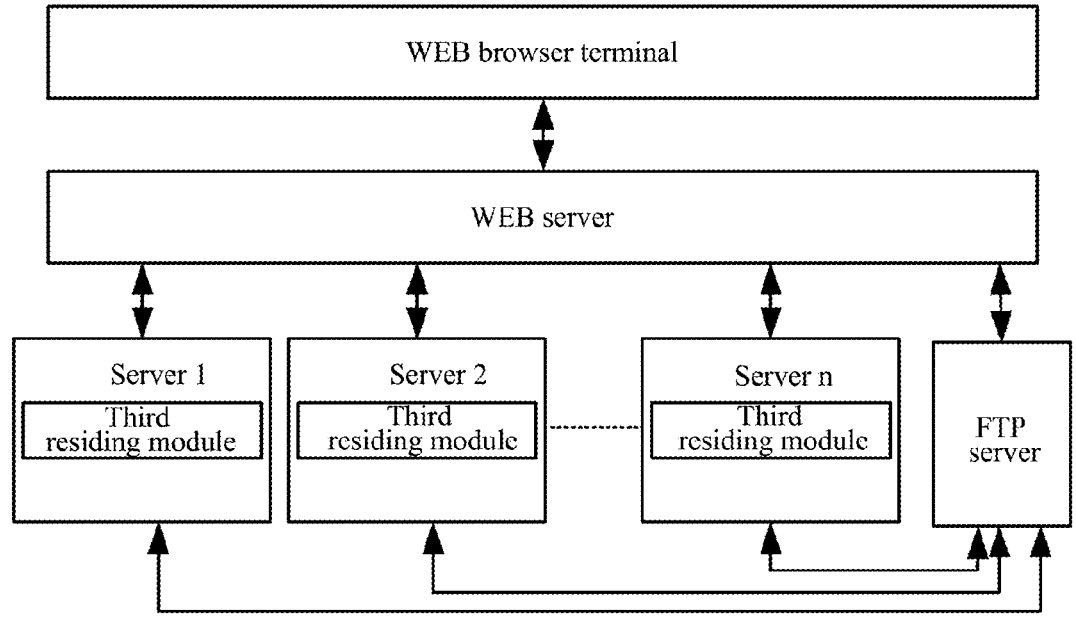
FIG. 2 is a structural schematic diagram of another embodiment of the system according to the present invention.

According to another embodiment of the present invention, as shown in FIG. 2, the first residing module and second residing module can be integrated in a third residing module, and the residing module is a program resided on the server for providing an external calling interface so as to achieve FTP and perform operations such as man-machine command and so on. The configuration management terminal is a WEB browser terminal, and the configuration management server is a WEB server.

An embodiment of a method for controlling remote configuration according to the present invention comprises:

a configuration management terminal requests configuration file to be remotely configured and managed from a configuration management server;

the configuration management server returns a configuration item of the configuration file to the configuration management terminal according to a configuration definition corresponding to the configuration file, with the configuration definition comprising the attributes of the configuration item in the corresponding configuration file; and the configuration management terminal modifies the configuration item and submits the modified configuration item to the configuration management server, and the configuration management server modifies the configuration file after modifying and verifying the submitted configuration item according to the attributes of the configuration item.

According to the method embodiments of the present invention, the attributes of the configuration item comprises value type, maximum, minimum and user rights and so on.

According to the method embodiments of the present invention, the configuration definition is a file in the format of extensible markup language (XML).

According to the method embodiments of the present invention, the configuration management server sends a request for a configuration file and a configuration definition to the server where the configuration file is located according to the configuration file; the server where the configuration file is located returns the configuration file and configuration definition; and the configuration management server returns the configuration item of the configuration file to the configuration management terminal according to the configuration definition in combination with the user rights of the configuration management terminal.

According to the method embodiments of the present invention, the server where the configuration file is located returning the configuration file and configuration definition in particular is performed by the following operations: the server where the configuration file is located uploads the configuration file and configuration definition to an FTP server; the server where the configuration file is located notifies the configuration management server that the upload is completed; and the configuration management server downloads the configuration file and configuration definition from the FTP server.

According to the method embodiments of the present invention, the server where the configuration file is located receives the configuration file and configuration definition request sent from the configuration management server via a first residing module, and uploads the configuration file and configuration definition to the FTP server to notify the configuration management server that the upload is completed.

According to the method embodiments of the present invention, the configuration management terminal modifies the configuration item; the configuration management server verifies the modified configuration item and modifying the configuration file according to the configuration definition; the configuration management server uploads the modified configuration file to the FTP server; the configuration management server notifies the first residing module to download the modified configuration file; and the first residing module downloads the modified configuration file from the FTP server.

According to the method embodiments of the present invention, a process of maintaining the configuration definition is also comprised, where the maintenance comprises generation and modification.

According to the method embodiments of the present invention, the configuration management terminal requests a configuration file of a node to be remotely configured and managed from the configuration management server; the configuration management server obtains a configuration file list according to the configuration file; the configuration management server returns the configuration file list to the configuration management terminal; the configuration management terminal selects a configuration file to be modified from the configuration file list; and the configuration management server returns a configuration item to the user according to the configuration definition of the selected configuration file.

According to the method embodiments of the present invention, the configuration management server requests the configuration file list from a server which has the configuration file list according to the configuration file by way of the configuration file list definition; and the server which has the configuration file list returns the configuration file list.

According to the method embodiments of the present invention, the configuration file list definition is a file in the format of XML.

According to the method embodiments of the present invention, the configuration file list definition comprises file name, file path and user rights.

According to the method embodiments of the present invention, the configuration management server requests the configuration file list definition from a server which includes the configuration file list definition of the configuration file according to the configuration file; the server which includes the configuration file list definition of the configuration file uploads the configuration file list definition to the FTP server via a second residing module; the configuration management server downloads the configuration file list definition from the FTP server; the configuration management server queries the configuration file list according to the file name and path in the configuration file list definition; and the configuration management server returns the configuration file list to the configuration management terminal.

According to the method embodiments of the present invention, a process of maintaining the configuration file list definition is also comprised, where the maintenance comprises generation and modification.

According to the method embodiments of the present invention, it further comprises: the configuration management server records the configuration file before being modified and the modified configuration file together with the information about the configuration management terminal into a database.

According to the method embodiments of the present invention, the configuration management terminal is a WEB browser terminal, and the configuration management server is a WEB server.

Figure 3:
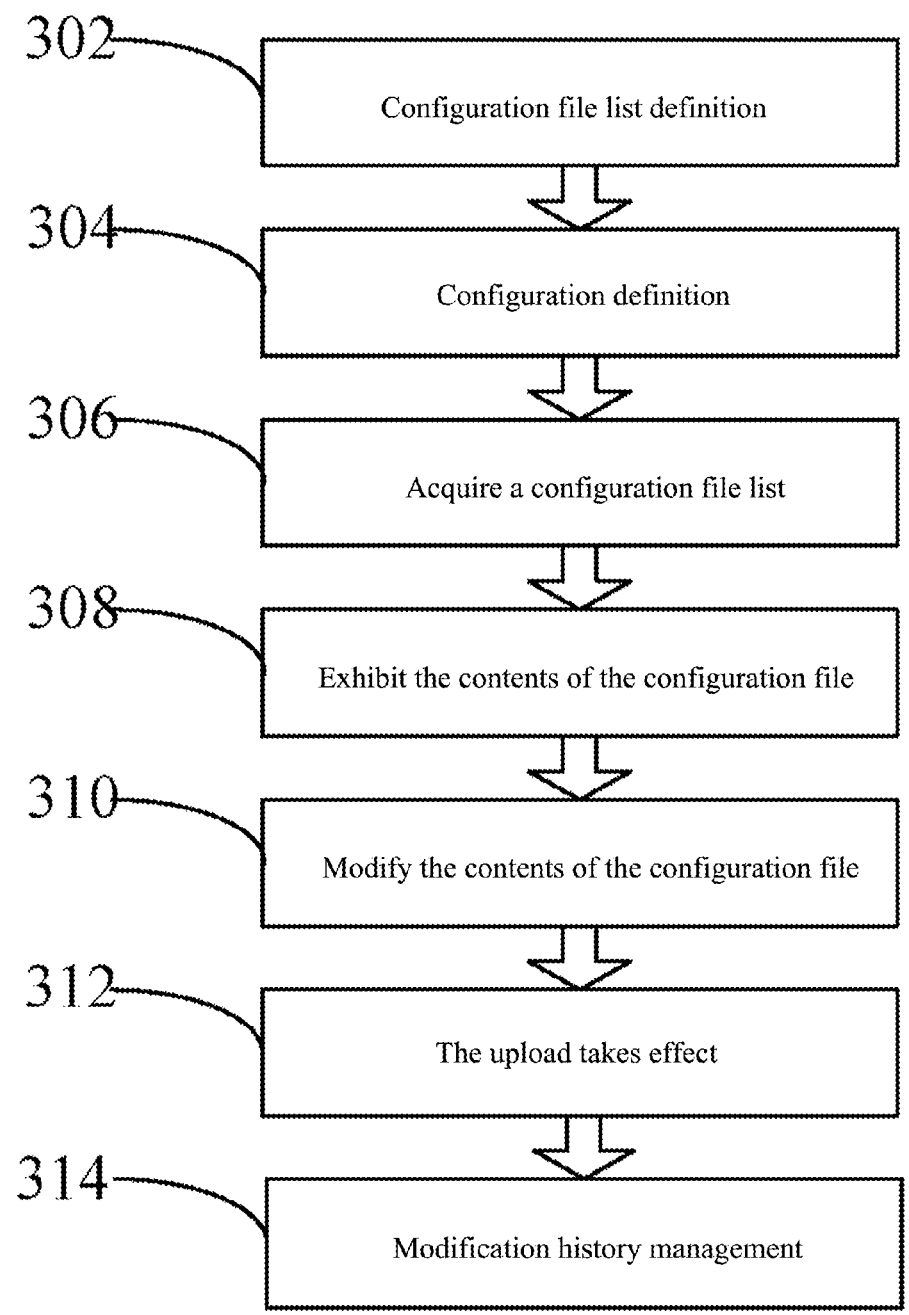
FIG. 3 is a flowchart of configuration and management of an embodiment of a method according to the present invention.

FIG. 3 shows the flow of another embodiment of the method according to the present invention, including the following steps:

Step 302: configuration file list definition.

With the increasing of the application functions, the configuration files for various functions are also increasing, at the same time, various configuration files need to be divided into different classes to be provided to different users for view and configuration. According to the method embodiments of the present invention, it is designed to support a multi-list file, and the file right can also be defined. The naming rule for the list to define a file is *-zxsde.xml. According to an embodiment of the method of the present invention, its particular configuration is as shown in Table 1.

TABLE 1

| Node name | Attribute name | Annotation |
| --- | --- | --- |
| Filelist | | File list node |
| File | | File node |
| File | name | File name |
| File | path | File path |
| File | encrypted | Whether encrypted |
| File | charset | Character encoding |
| File | commentzh | Chinese annotation |
| File | commenten | English annotation |
| Visible | | File rights list |

This configuration file list definition can compile the file manually and can also be generated with the assistance of a tool, and its typical steps include: ① select a configuration file directory; ② list all the configuration files under this directory and its subdirectory; ③ configuration the annotation, whether encrypted, character encoding, rights list, etc. of each file by way of a configuration page; and ④ save the same as a configuration file list definition file.

Step 304: configuration definition.

As to a certain configuration file, the configuration items which the user is interested in may be different in different situations. At the same time, as to users with different rights, it needs to control whether the configuration items are visible. According to the method embodiments of the present invention, a conventional ini file is divided into two layers, wherein the first layer is referred to as a configuration group (APP), and the second layer is referred to as a configuration item. As to the configuration group, the name, whether repeatable, and the start and end numbers need to be defined. As to the configuration item, field attribute, default value, maximum value, minimum value, annotation, and rights list need to be defined. The naming rule is *-zxfde.xml. According to an embodiment of the method of the present invention, its particular configuration definition is as shown in Table 2.

TABLE 2

| Node name | Attribute name | Annotation |
| --- | --- | --- |
| App | | Configuration item group node |
| App | name | Group name |
| App | repeatable | Whether repeatable |
| Key | | Configuration item node |

TABLE 2-continued

| Node name | Attribute name | Annotation |
|---|---|---|
| Key | name | Configuration item name |
| Key | type | Value type of configuration item, types such as number, string, or IP address, etc. |
| Key | default | Default value |
| Key | min | Minimum, string type represents length minimum |
| Key | max | Maximum, string type represents length maximum |
| Key | commentzh | Chinese annotation |
| Key | commenten | English annotation |
| Visible | | Rights list |

For the configuration definition, the configuration definition file can be compiled manually and can also be generated with the assistance of a tool, and its typical steps include: ① select a configuration file; ② list all the configuration items in this configuration file; ③ configuration whether the configuration item group is repeatable, name, type, maximum and minimum, annotation, rights list, etc. of the configuration item by way of a configuration page; and ④ save the same as a configuration definition file.

Steps 302 and 304 achieve the universality and plugin feature of configuration and management. That is to say, as long as a list definition file and a configuration definition file are generated according to the specified format and saved into a folder of the server, the management function of the configuration file by this server can be achieved.

Step 306: acquire a file list.

According to an embodiment of the method of the present invention, since the configuration file and configuration definition file are placed on various servers, the WEB server has to download these files and then parse them. According to the architecture of FIG. 2, the WEB server has to determine to carry out the configuration and management operation in which server and acquire the file using the residing module in the manner of transferring by a common FTP server.

Figure 4:
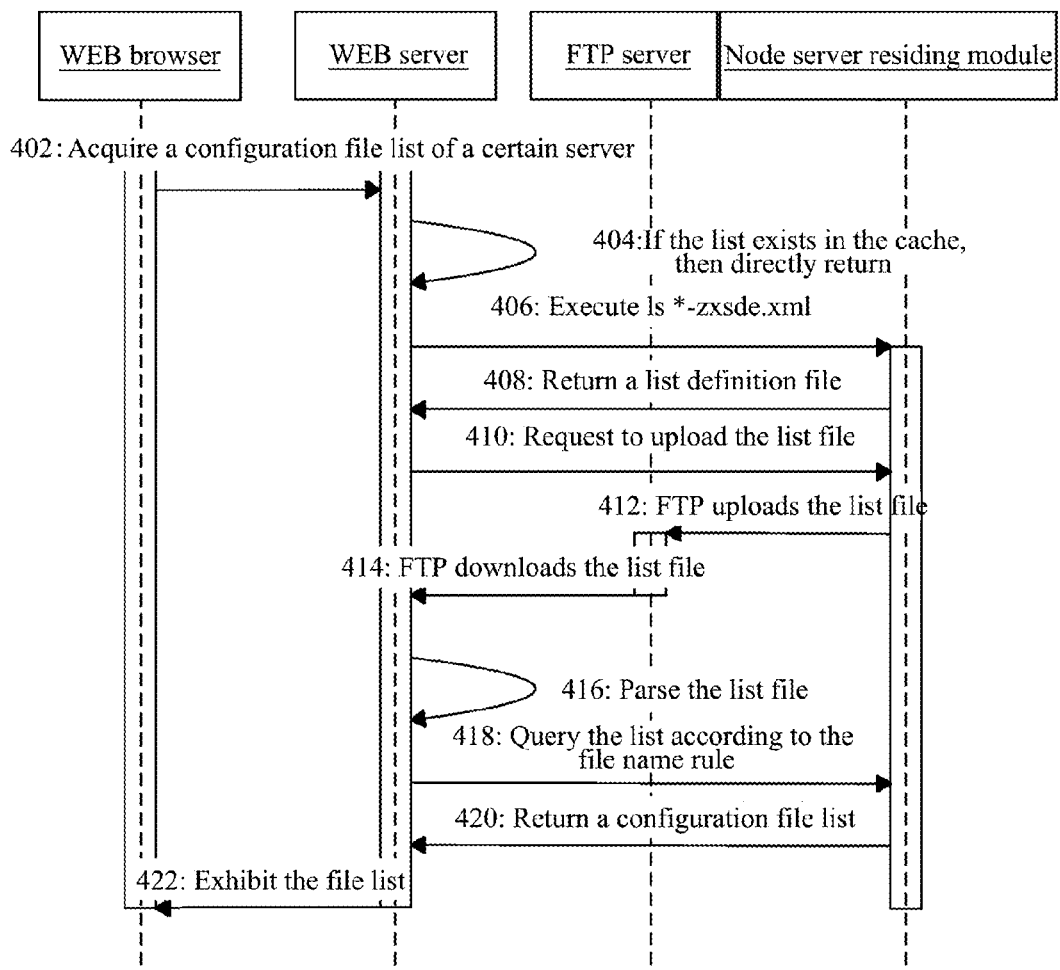
FIG. 4 is a sequential flowchart diagram of acquiring a configuration file list of an embodiment of the method according to the present invention.

Its flow is as shown in FIG. 4, and includes the following steps:

Step 402: the WEB browser requests a configuration file list of a certain node from the WEB service end.

Step 404: the WEB server judges whether this list exists in the cache, if yes, then it directly returns a configuration file list.

Step 406: if the configuration file list does not exist, then the residing module on this node server will execute the ls *-zxsde.xml file.

Step 408: this node server returns the names of all the configuration file list definition files to the WEB server.

Step 410: the WEB server requests the residing module to upload the configuration file list files according to the file names.

Step 412: the residing module uploads these list files to the FTP server.

Step 414: the WEB server downloads these list files from the FTP server.

Step 416: the WEB server parses these list files.

Step 418: the WEB server queries the files according to the file names and paths defined by these list files.

Step 420: return the configuration file list.

Step 422: exhibit the configuration file list in the WEB browser in combination with the rights.

The user can select a configuration file to be maintained or managed in the WEB browser.

Step 308: exhibit the contents of the configuration file.

Figure 5:
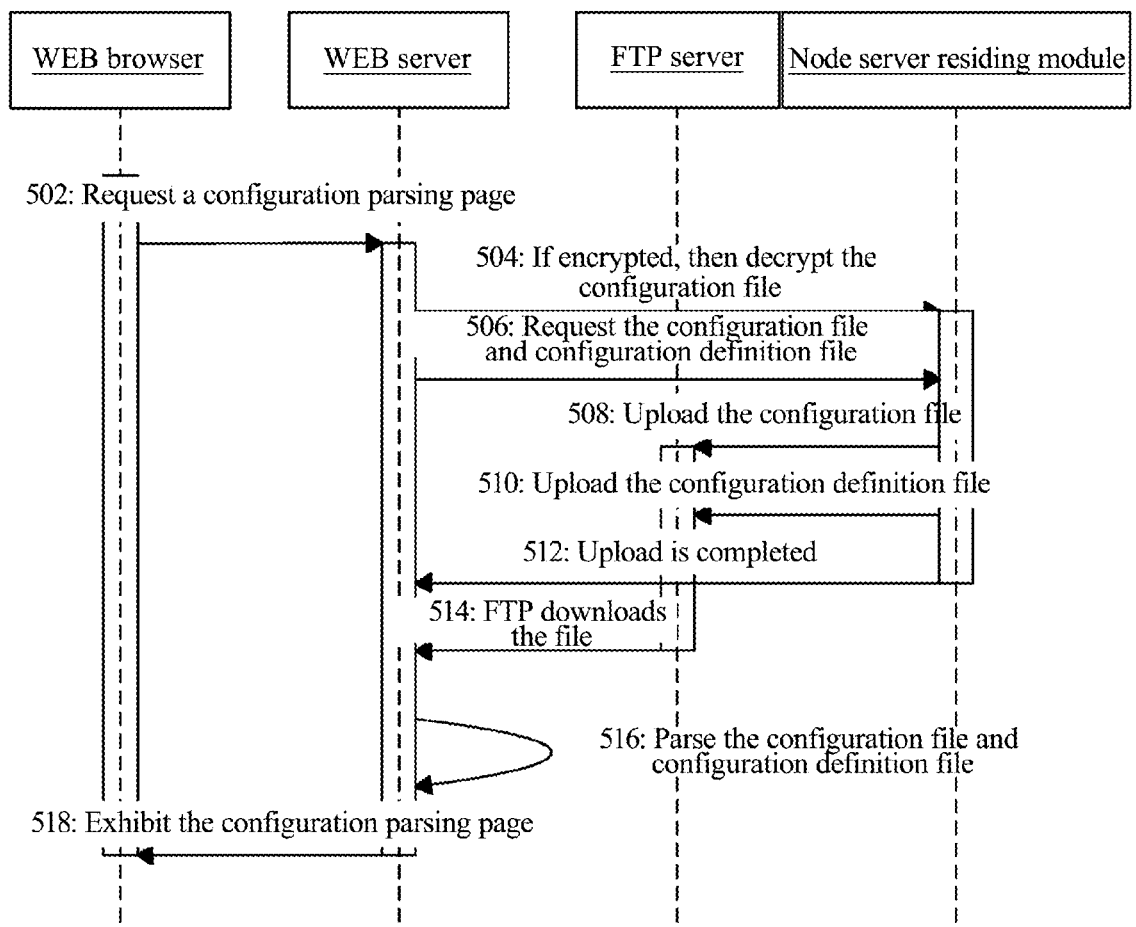
FIG. 5 is a sequential flowchart diagram of configuration parsing and exhibition of an embodiment of the method according to the present invention.

According to the method embodiments of the present invention, to exhibit the contents of the configuration file in the WEB browser needs to be in the manner of HTML sheet, and also the exhibition of the contents of the configuration file have to be controlled according to the rights, which requires to acquire the configuration definition file and the configuration file per se, and according to an embodiment of the method of the present invention, its particular steps are as shown in FIG. 5.

Step 502: the WEB browser requests a configuration page according to the node attributes and the configuration file name.

Step 504: if the configuration file is encrypted, then the WEB server requests the residing module on the node server to execute the decryption operation.

Step 506: the WEB server requests the configuration file and configuration definition file from the residing module on the node server.

Step 508: the residing module uploads the configuration file to the FTP server.

Step 510: the residing module uploads the configuration definition file to the FTP server.

Step 512: the residing module notifies the WEB server that the upload is completed.

Step 514: the WEB server downloads the configuration file and configuration definition file from the FTP server.

Step 516: parse the configuration file and configuration definition file in combination with the user rights.

Step 518: exhibit the configuration page on the WEB browser.

At this moment, the user can modify the configuration item of the configuration file in the WEB browser.

Step 310: modify the contents of the configuration file.

The WEB server transfers the results to the page according to the contents of the configuration file and definition file.

As to a repeatable group, there are delete and add operations, and the number of groups can be dynamically changed. By exhibiting via the configuration page, the user can only modify the data but cannot modify other contents, which ensures the accuracy of the format of the configuration file and reduces problems due to input errors.

At the same time, the basic attributes can be checked according to the configuration definition, for example, maximum and minimum value, maximum and minimum length, whether it is null, whether it is number, whether it is an IP address, etc.

Step 312: the upload takes effect.

Figure 6:
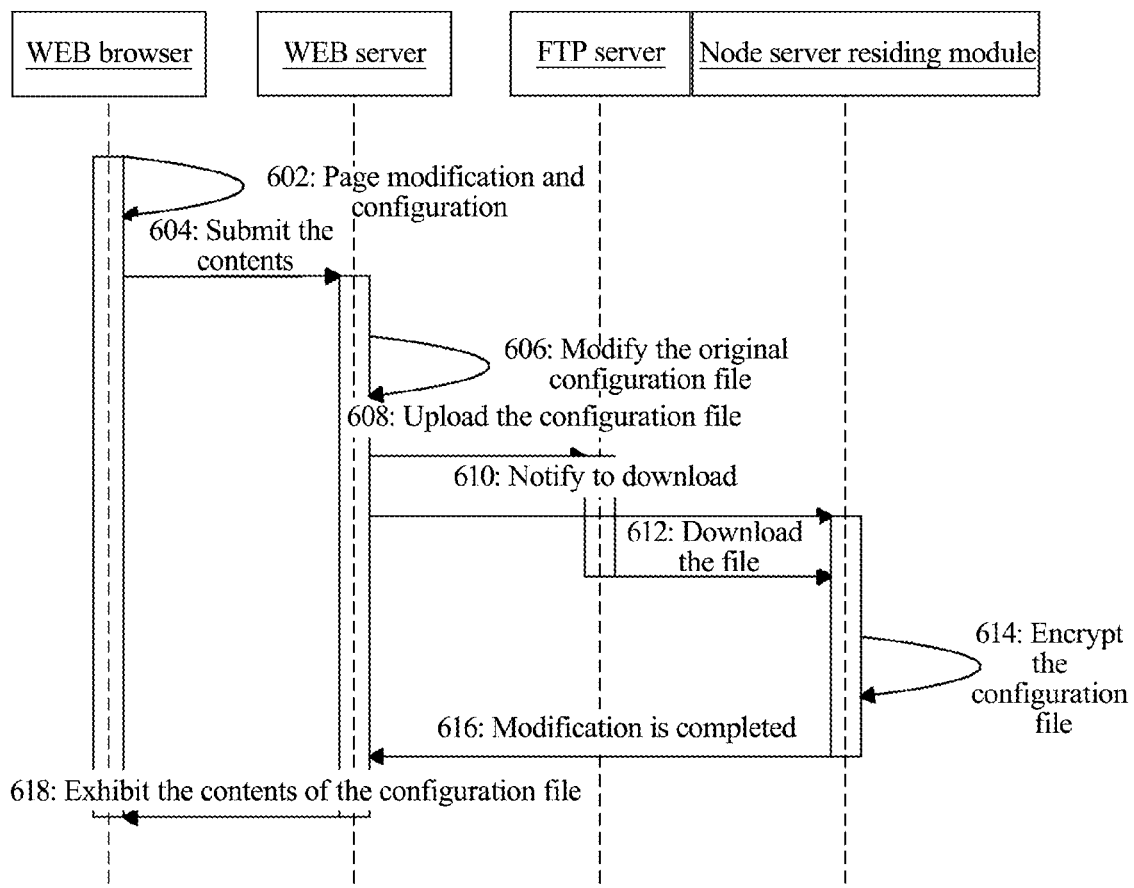
FIG. 6 is a sequential flowchart diagram of configuration uploading and taking effect of an embodiment of the method according to the present invention.

By way of the interface, the configuration and modification are completed and saved into the file of the WEB server and need be uploaded to the node. The file upload module also employs the manner of interaction between the residing modules for uploading. According to an embodiment of the method of the present invention, its flowchart is as shown in FIG. 6, including the following steps:

Step 602: complete the modification of the file on the WEB browser page.

Step 604: by way of sheet, submit the data to the WEB server.

Step 606: the WEB server modifies the configuration file according to the submitted sheet data.

Step 608: the WEB server uploads the modified configuration file to the FTP server.

Step 610: the WEB server notifies the residing module of the node server to download the modified configuration file.

Step 612: the residing module of the node server downloads the modified configuration file.

Step 614: if it needs to be encrypted, then encrypt the configuration file.

Step 616: notify the WEB server that the modification is completed.

Step 618: exhibit the contents of the configuration file.

As such, the process of remote configuration is completed.

Step 314: modification history management.

When the user submits the modification, the configuration and management system will record the original configuration file and modified configuration file contents together with the user information into a database. History query is provided on the page, and the query page provides comparison of the pre and post files, if they are different, then display them with highlight.

History management is very important to configuration. Generally, the history records cannot be reserved if the configuration file is modified by the editor, and the user cannot know which user modifies which configuration item at which time and at which location in a certain configuration file. The history management of the configuration file solves this problem.

In summary, the present invention maintains and manages the configuration items of various configuration files according to the configuration definitions corresponding to the configuration files, so as to achieve universal management of configuration files, and when a new configuration file occurs, it can be extended by way of the configuration definition; the configuration item attribute definition in the configuration definition can conveniently manage and monitor the configuration item, the modification thereof can be verified and the user rights setting thereof can control which user to modify which configuration item in different scenarios; the configuration definition and configuration file are stored in the server, and different configuration files and configuration definitions can be stored in different servers; the maintainability of the configuration definition achieves extensibility of the management of the configuration file; the configuration definition and configuration file being transferred by the FTP server via the first residing module can avoid opening the FTP service on numerous management servers, improving system security; in the present invention, the selection of the configuration file is achieved by interacting with the terminal in the manner of configuration file list and configuration file list definition, and there can be a plurality of configuration file list definitions, so that each item can manage its own configuration file list, avoiding the conflict problem caused due to simultaneous modification on the same list; the maintainability of the list file definition achieves extensibility of the configuration file list; the configuration management terminal employs a WEB browser terminal, and the configuration management server employs a WEB server, making the entire management process simple, intuitive and easy to be integrated with the existing systems; and the modification history information being stored on the configuration management server provides means for troubleshooting and learning the history configuration situation.

The above is a further detailed description of the present invention in conjunction with particular embodiments, and the particular embodiments of the present invention shall not be deemed as being limited to such description. For those having ordinary skills in the technical field to which the present invention belongs, several simple deductions or replacements can be without departing from the concept of the present invention, which shall be viewed as belonging to the scope of protection of the present invention.

What is claimed is:

1. A computer implemented method for controlling remote configuration, comprising:

a configuration management terminal requesting a configuration file to be remotely configured and managed from a configuration management server;

the configuration management server returning a configuration item of the configuration file to the configuration management terminal according to a configuration definition corresponding to the configuration file, with the configuration definition comprising attributes of the configuration item in the corresponding configuration file, wherein the attributes of the configuration item comprise a value type, a maximum, a minimum, and a user right;

the configuration management terminal modifying the configuration item and then submitting the modified configuration item to the configuration management server; and the configuration management server modifying the configuration file after verifying the modified configuration item submitted by the configuration management terminal according to the attributes of the configuration item.

2. The computer implemented method for controlling remote configuration as claimed in claim 1, wherein the configuration definition is a file in a format of extensible markup language (XML).

3. The computer implemented method for controlling remote configuration as claimed in claim 1, wherein the configuration management server returning a configuration item of the configuration file to the configuration management terminal according to a configuration definition corresponding to the configuration file in particular comprises:

the configuration management server sending a request for the configuration file and the configuration definition to a server where the configuration file is located according to the configuration file;

the server where the configuration file is located returning the configuration file and configuration definition; and the configuration management server returning the configuration item of the configuration file to the configuration management terminal according to the configuration definition in combination with the user right of the configuration management terminal.

4. The computer implemented method for controlling remote configuration as claimed in claim 3, wherein the server where the configuration file is located returning the configuration file and configuration definition is performed according to the following operations particularly:

the server where the configuration file is located uploading the configuration file and configuration definition to an FTP processor;

the server where the configuration file is located notifying the configuration management server that the upload is completed; and the configuration management server downloading the configuration file and configuration definition from the FTP processor.

5. The computer implemented method for controlling remote configuration as claimed in claim 4, the method further comprising: the server where the configuration file is located receiving the request for the configuration file and configuration definition sent from the configuration management server particularly via a first storage device, and uploading the configuration file and configuration definition to the FTP processor to notify the configuration management server that the upload is completed.

6. The computer implemented method for controlling remote configuration as claimed in claim 5, wherein the configuration management terminal modifying the configuration item and submitting the modified configuration item to the configuration management server, and the configuration management terminal modifying the configuration file after modifying and verifying the submitted configuration item according to the attributes of the configuration item in particular comprises:
the configuration management terminal modifying the configuration item;
the configuration management server verifying the modified configuration item and modifying the configuration file according to the configuration definition;
the configuration management server uploading the modified configuration file to the FTP processor;
the configuration management server notifying the first storage device to download the modified configuration file; and
the first storage device downloading the modified configuration file from the FTP processor.

7. The computer implemented method for controlling remote configuration as claimed in claim 1, wherein the method further comprises a process of maintaining the configuration definition, with the maintenance comprising generation and modification.

8. The computer implemented method for controlling remote configuration as claimed in claim 1, wherein a configuration management terminal requesting a configuration file to be remotely configured and managed from a configuration management server and the configuration management server returning a configuration item of the configuration file to the configuration management terminal according to a configuration definition corresponding to the configuration file in particular comprises:
the configuration management terminal requesting a configuration file of a node to be remotely configured and managed from the configuration management server;
the configuration management server obtaining a configuration file list according to the configuration file;
the configuration management server returning the configuration file list to the configuration management terminal;
the configuration management terminal selecting a configuration file to be modified from the configuration file list; and
the configuration management server returning a configuration item to a user according to the configuration definition of the selected configuration file.

9. The computer implemented method for controlling remote configuration as claimed in claim 8, wherein the configuration management server returning the configuration file list to the configuration management terminal in particular comprises:
the configuration management server requesting the configuration file list from a server which has the configuration file list according to the configuration file by way of configuration file list definition; and
the server which has the configuration file list returning the configuration file list.

10. The computer implemented method for controlling remote configuration as claimed in claim 9, wherein the configuration file list definition is a file in a format of XML.

11. The computer implemented method for controlling remote configuration as claimed in claim 9, wherein the configuration file list definition comprises file name, file path and user right.

12. The computer implemented method for controlling remote configuration as claimed in claim 11, wherein the configuration management server requesting the configuration file list from a server which has the configuration file list according to the configuration file by way of the configuration file list definition in particular comprises:
the configuration management server requesting the configuration file list definition from a server which includes the configuration file list definition of the configuration file according to the configuration file;
the server which includes the configuration file list definition of the configuration file uploading the configuration file list definition to the FTP processor via a second storage device;
the configuration management server downloading the configuration file list definition from the FTP processor;
the configuration management server querying the configuration file list according to the file name and path in the configuration file list definition; and
the configuration management server returning the configuration file list to the configuration management terminal.

13. The computer implemented method for controlling remote configuration as claimed in claim 12, wherein the method further comprises a process of maintaining the configuration file list definition, with the maintenance comprising generation and modification.

14. The computer implemented method for controlling remote configuration as claimed in claim 1, the computer implemented method further comprising:
the configuration management server recording the configuration file before being modified and the modified configuration file together with information about the configuration management terminal into a database.

15. The computer implemented method for controlling remote configuration as claimed in claim 1 wherein the configuration management terminal is a WEB browser terminal, and the configuration management server is a WEB server.

16. A system for controlling remote configuration, comprising a configuration management terminal having a processor and a configuration management server having a processor, wherein,
the configuration management terminal is used for requesting a configuration file to be remotely configured and managed from the configuration management server and further used for modifying a configuration item and submitting the modified configuration item to the configuration management server; and
the configuration management server is used for returning the configuration item of the configuration file to the configuration management terminal according to configuration definition corresponding to the configuration file, with the configuration definition comprising attributes of the configuration item corresponding to the configuration file; and further used for modifying the configuration file after modifying and verifying the submitted configuration item according to the attributes of the configuration item, wherein the attributes of the configuration item comprise a value type, a maximum, a minimum, and a user right.

17. The system for controlling remote configuration according to claim 16, wherein the configuration management server is further used for receiving the configuration file and configuration definition returned by a server where the configuration file is located according to a request for the configuration file and configuration definition sent by the server where the configuration file is located, and returning the configuration item of the configuration file to the configuration management terminal according to the configuration definition in combination with the user right of the configuration management terminal; and the system further comprises a first storage device and an FTP processor, wherein the first residing module is configured in a server of a node to be configured and managed, and used for receiving the request for the configuration file and configuration definition sent by the configuration management server and uploading the configuration file and configuration definition to the FTP processor to notify the configuration management server that the upload is completed;

the configuration management server is further used for downloading the configuration file and configuration definition from the FTP processor; and the FTP processor is used for receiving the configuration file and configuration definition uploaded by the first storage device and sending the configuration file and configuration definition to the configuration management server which requests for the downloading.

18. The system for controlling remote configuration as claimed in claim 16, wherein the configuration management server is further used for requesting a configuration file list definition from a server which has the configuration file list definition of the configuration file according to the configuration file;

the system further comprises a second storage device, configured in the server of the node to be configured and managed and is used for receiving a request for the configuration file list definition sent by the configuration management server and uploading the configuration file list definition to the FTP processor; and the configuration management server is further used for downloading the configuration file list definition from the FTP processor, querying the configuration file list according to the file name and path in the configuration file list definition, and returning the configuration file list to the configuration management terminal.

* * * * *